Jan. 2, 1934.  F. BALDWIN  1,942,017
MACHINE FOR WRAPPING CAKES OR THE LIKE
Filed April 15, 1933   6 Sheets-Sheet 1
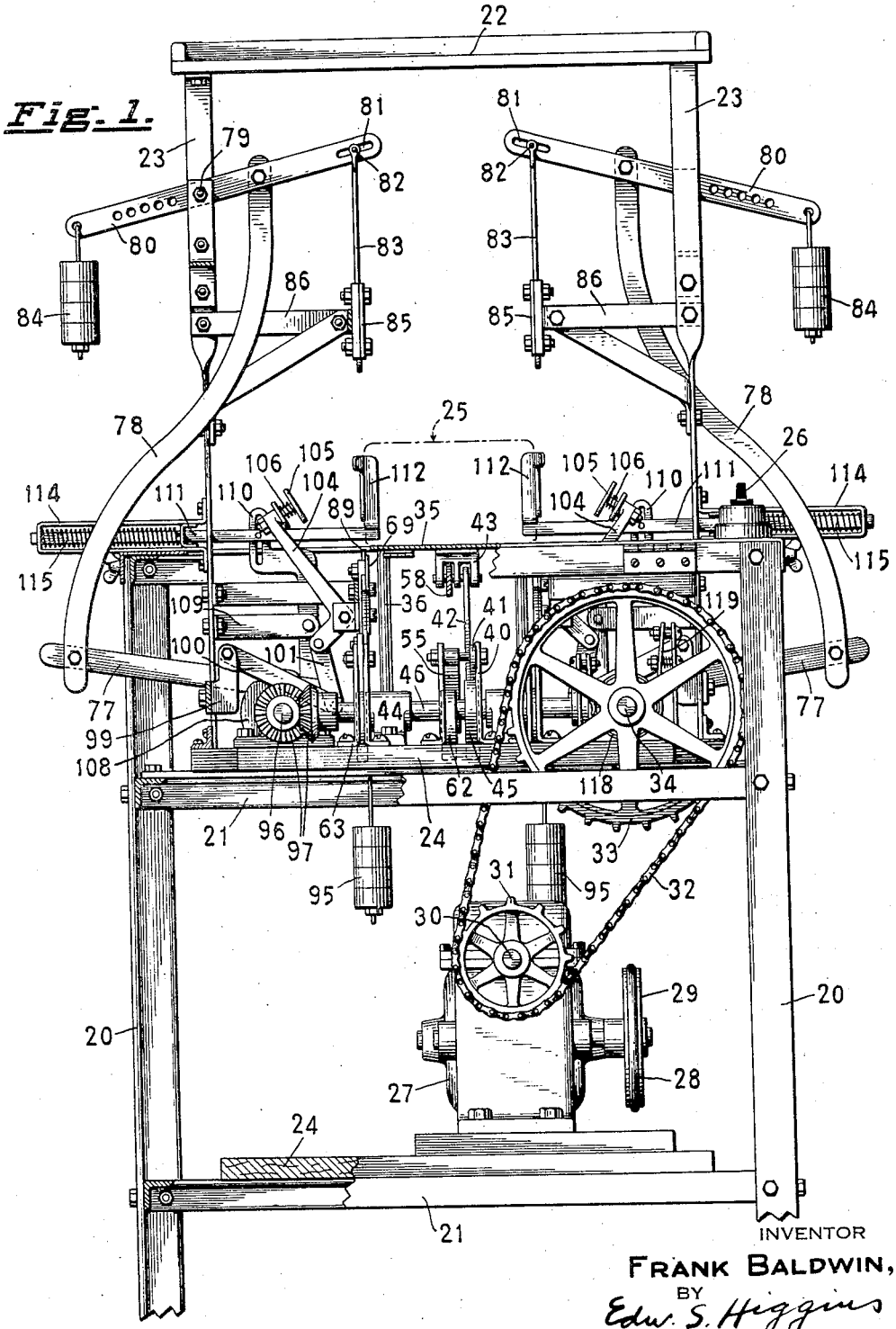
INVENTOR
FRANK BALDWIN,
BY
Edw. S. Higgins
ATTORNEY Jan. 2, 1934.　　　F. BALDWIN　　　1,942,017
MACHINE FOR WRAPPING CAKES OR THE LIKE
Filed April 15, 1933　　　6 Sheets-Sheet 2
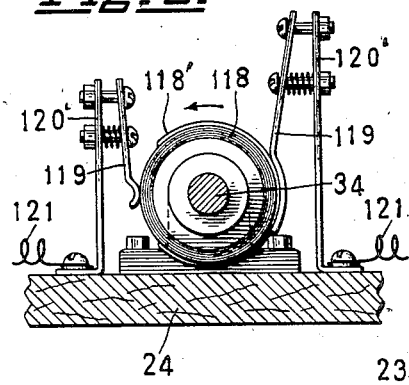
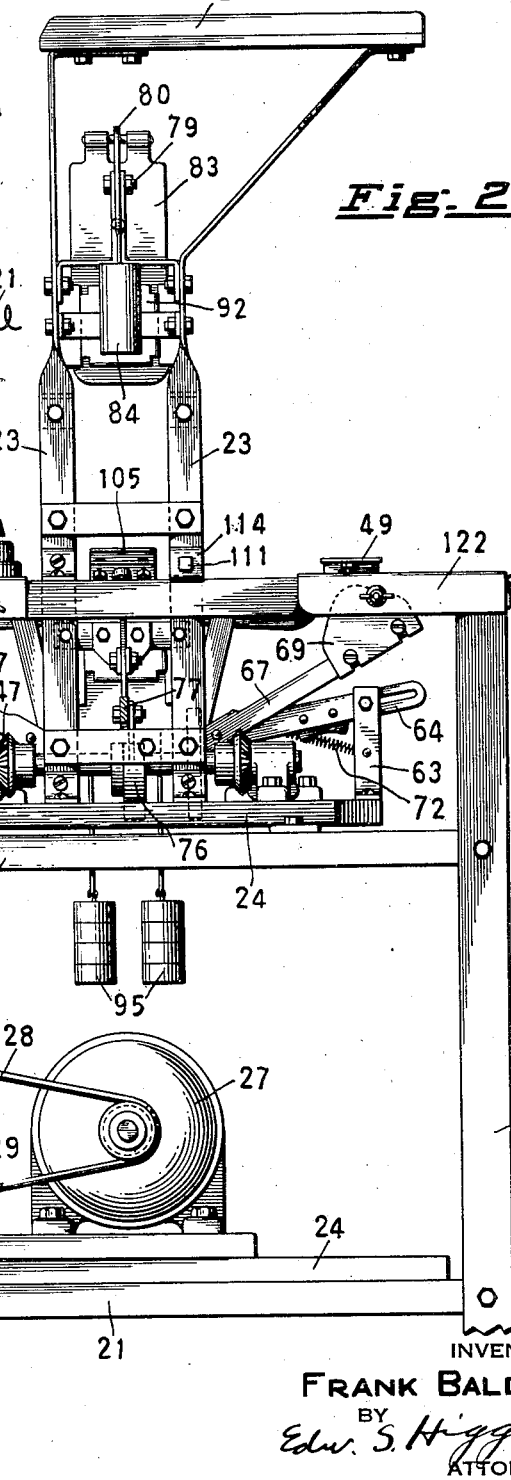
INVENTOR
FRANK BALDWIN,
BY
Edw. S. Higgins
ATTORNEY Jan. 2, 1934.　　　　F. BALDWIN　　　　1,942,017
MACHINE FOR WRAPPING CAKES OR THE LIKE
Filed April 15, 1933　　　6 Sheets-Sheet 3
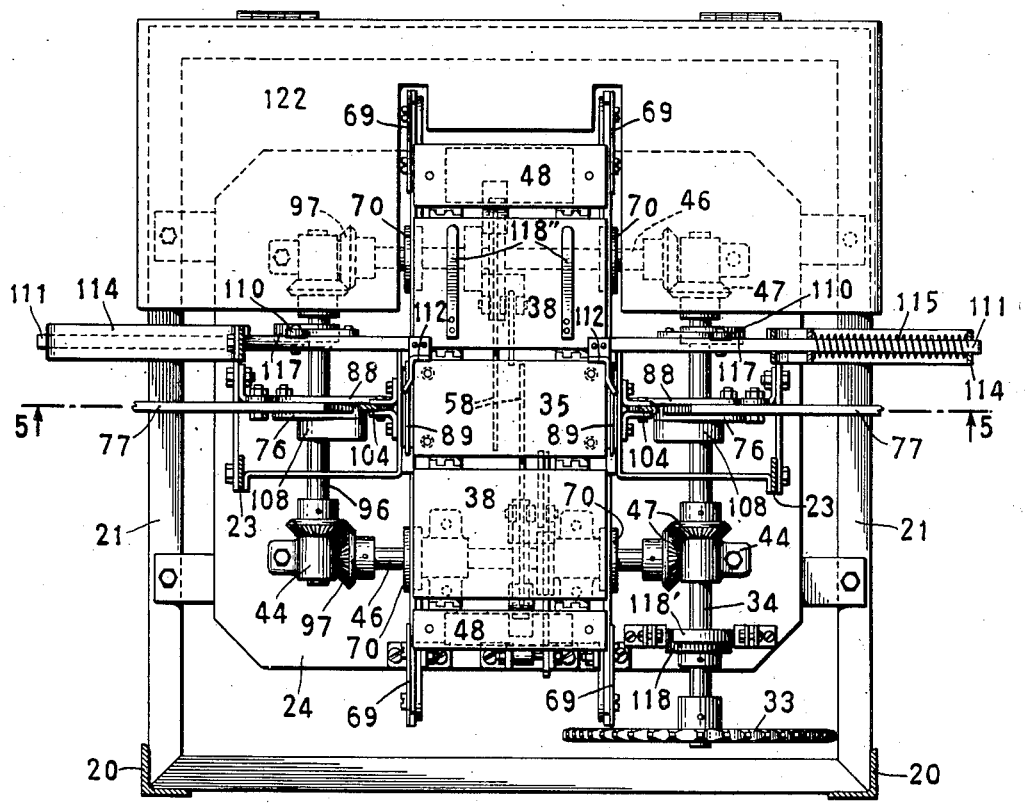
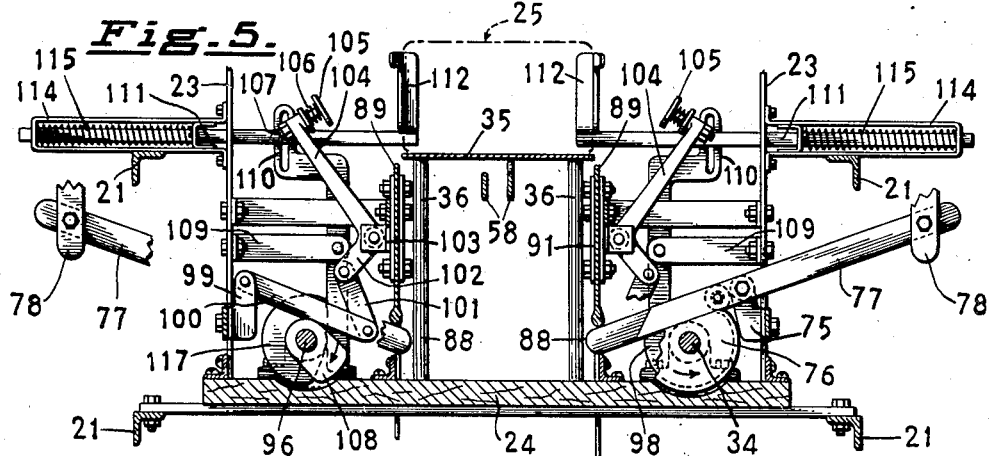
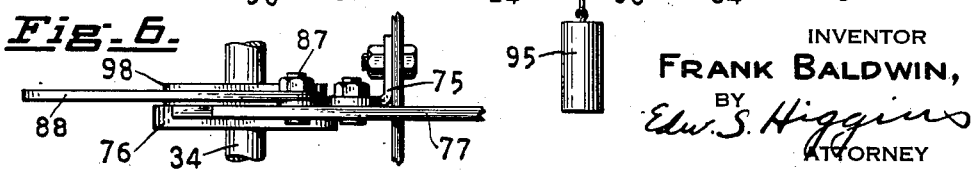
INVENTOR
FRANK BALDWIN,
BY
Edw. S. Higgins
ATTORNEY Jan. 2, 1934.    F. BALDWIN    1,942,017
MACHINE FOR WRAPPING CAKES OR THE LIKE
Filed April 15, 1933    6 Sheets-Sheet 4
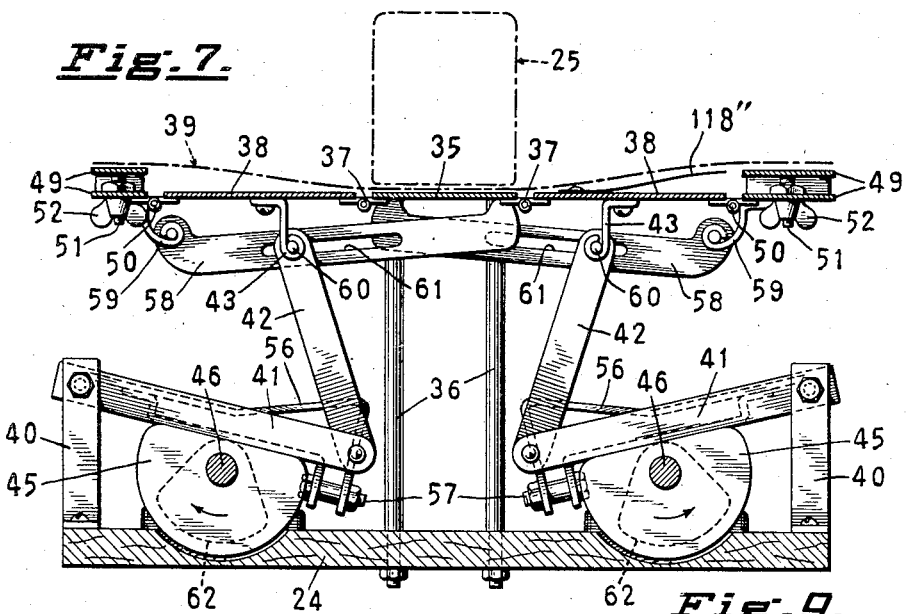
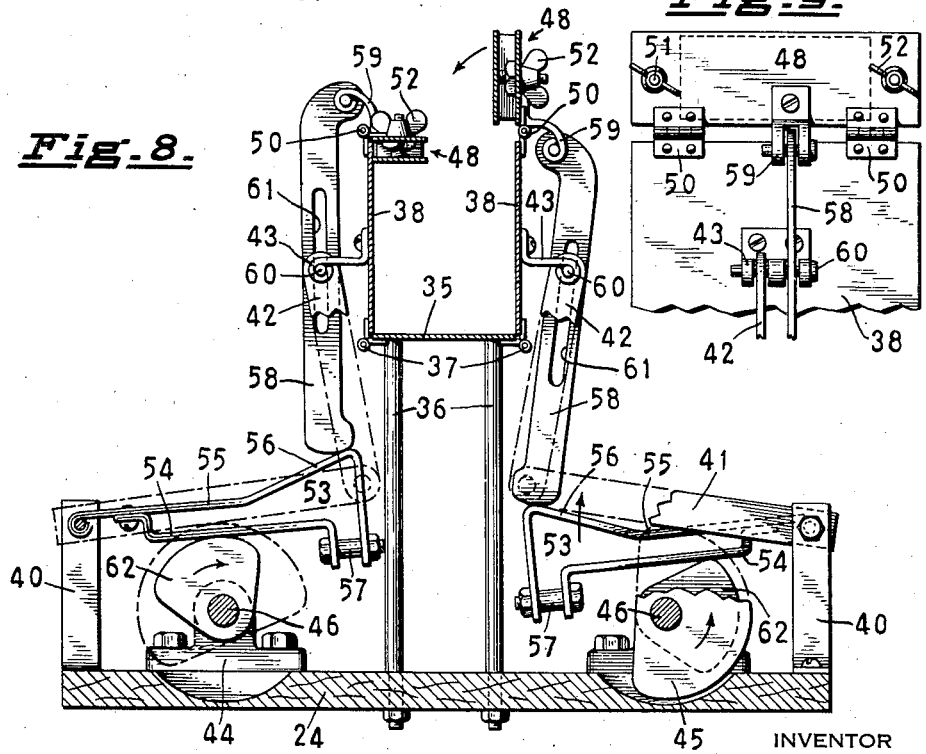
INVENTOR
FRANK BALDWIN,
BY
Edw. S. Higgins
ATTORNEY Jan. 2, 1934.   F. BALDWIN   1,942,017
MACHINE FOR WRAPPING CAKES OR THE LIKE
Filed April 15, 1933   6 Sheets-Sheet 5
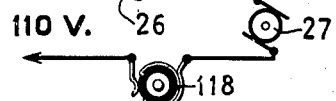
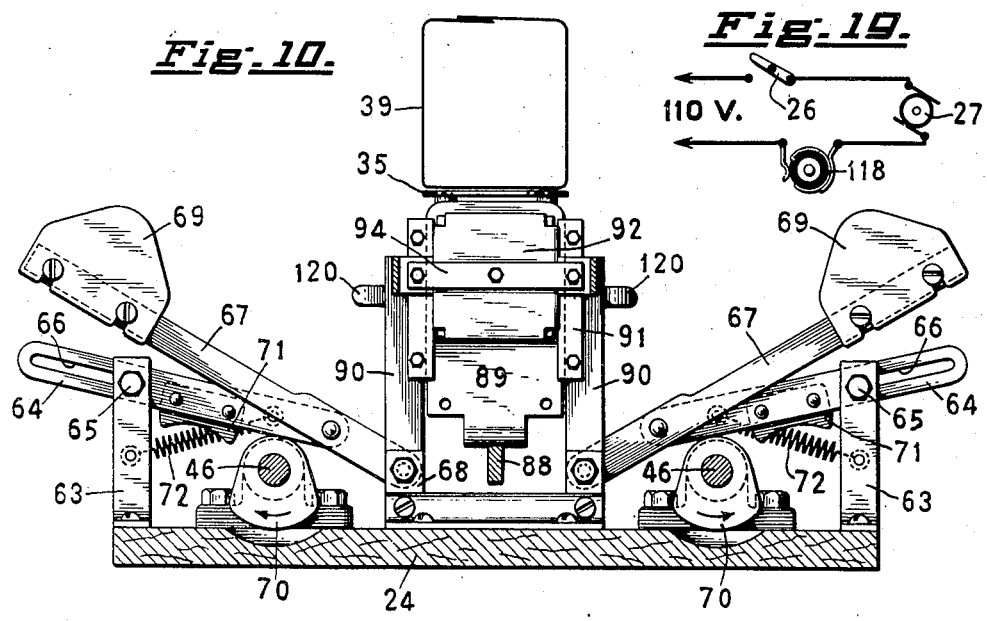
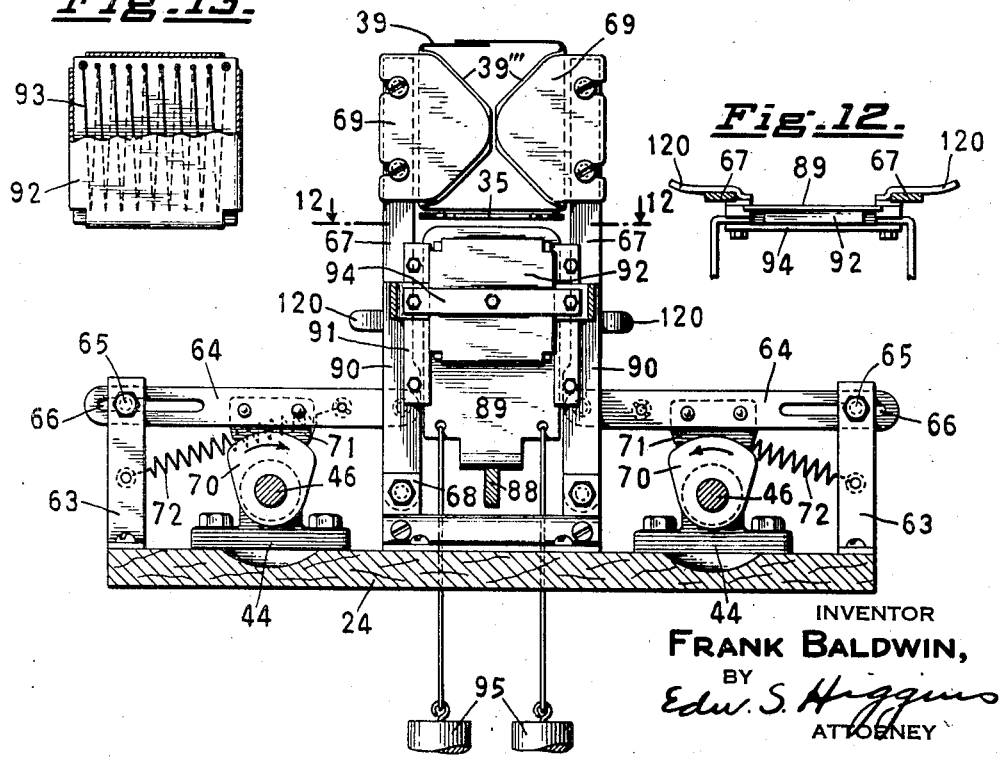
INVENTOR
FRANK BALDWIN,
BY
Edw. S. Higgins
ATTORNEY Jan. 2, 1934.   F. BALDWIN   1,942,017
MACHINE FOR WRAPPING CAKES OR THE LIKE
Filed April 15, 1933   6 Sheets-Sheet 6
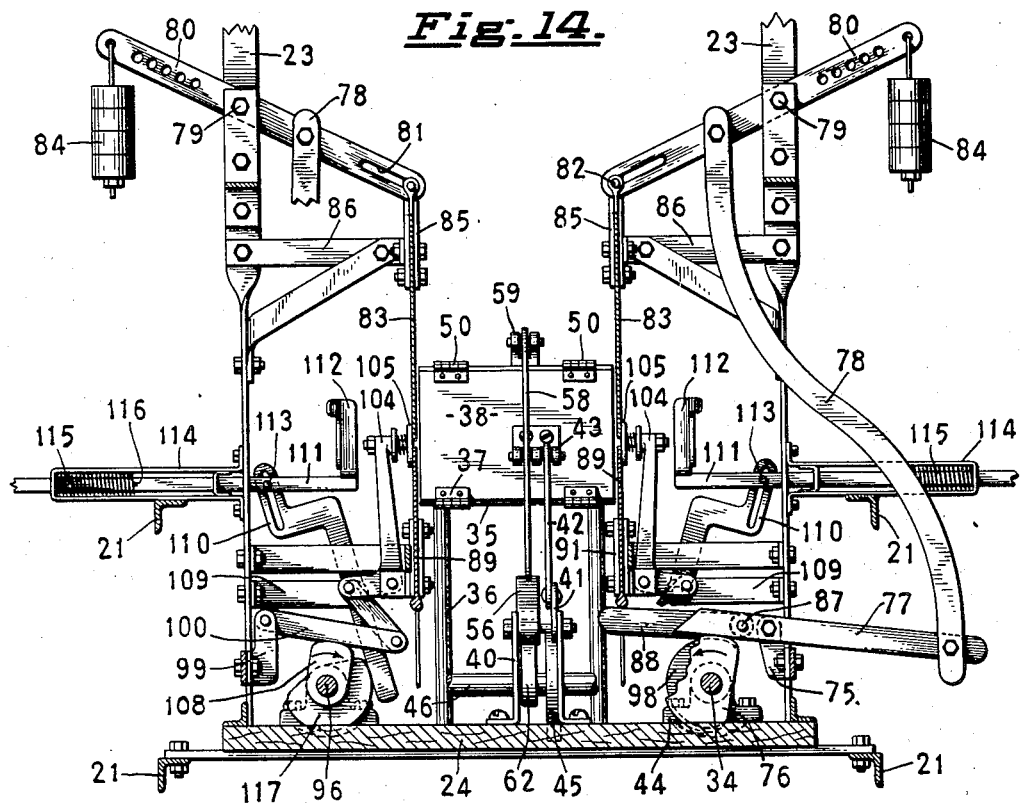
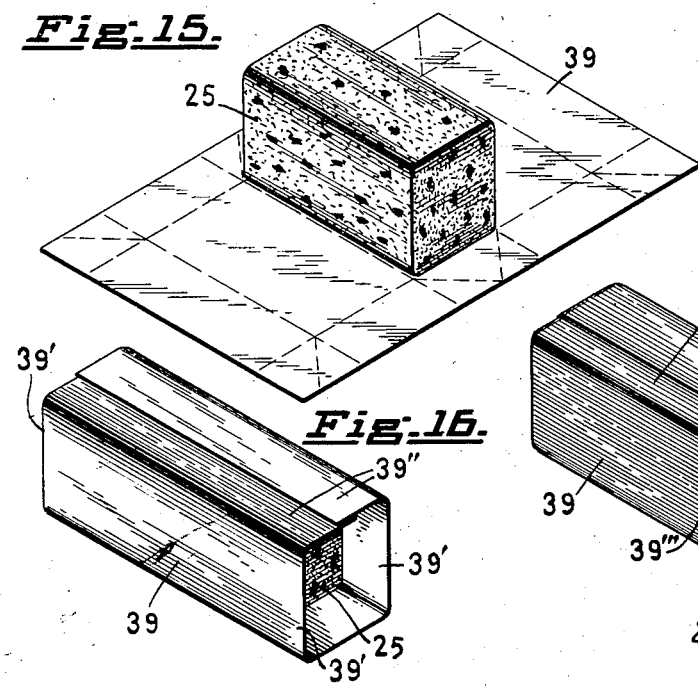
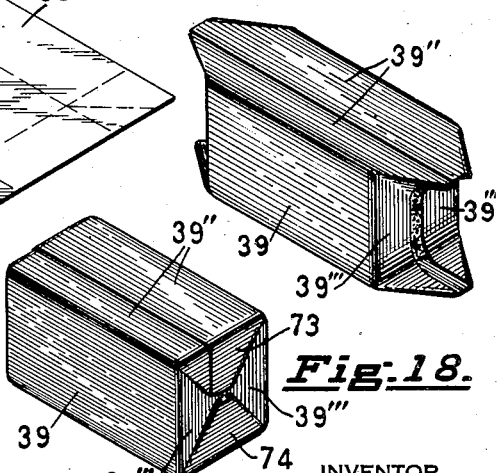
INVENTOR
FRANK BALDWIN,
BY
Edw. S. Higgins
ATTORNEY Patented Jan. 2, 1934

1,942,017

UNITED STATES PATENT OFFICE 1,942,017

MACHINE FOR WRAPPING CAKES OR THE LIKE

Frank Baldwin, Yonkers, N. Y.

Application April 15, 1933. Serial No. 666,316

5 Claims. (Cl. 93—2)

This invention relates to machines for wrapping cakes or the like.

An object of the invention is to provide a machine of this character that is simple and rugged in construction and economical to manufacture.

Another object is the provision of a machine of this character that is positive in operation.

Another object of the invention is the provision of a machine of this character with means for heating the wrapper to facilitate wrapping and sealing.

Another object of the invention is the provision of a machine of this character that is safe to operate.

Another object is the provision of means for positioning the article to be wrapped on the machine.

Another object is the provision of means for positioning the wrapper.

Other objects and advantages of the invention will be in part pointed out and in part obvious from the description thereof to follow taken in connection with the accompanying drawings in which—

Figure 1 is a front elevation of my improved machine, parts being shown in section.

Figure 2 is a side elevation thereof.

Figure 3 is a detail elevation of a limit switch used in my improved machine.

Figure 4 is a top plan view of my machine, one half of the cover plate being removed to show the underlying parts.

Figure 5 is a fragmentary sectional view taken on the plane indicated by the line 5—5 of Figure 4 and showing in detail the sealing mechanism.

Figure 6 is a fragmentary plan view of one of the operating levers and the motivating cam.

Figure 7 is a fragmentary sectional view on a large scale showing the mechanism for producing the side and top folds.

Figure 8 is a view similar to Figure 7 but showing the side folds completed and the top fold partly completed.

Figure 9 is a fragmentary plan view showing in detail the top folding mechanism.

Figure 10 is a fragmentary sectional view on a large scale showing the mechanism for producing the end tucks or folds at the side of the wrapper, said mechanism being in inoperative position.

Figure 11 is a view similar to Figure 10 but showing the mechanism in operative position.

Figure 12 is a fragmentary sectional view on the plane indicated by the line 12—12 of Figure 11.

Figure 13 is a detail view partly in section of a form of heating device used with my machine.

Figure 14 is a fragmentary cross sectional view showing the position of the parts after the completion of the end sealing or last folding operation.

Figure 15 is a perspective view of a cake positioned on a wrapper preparatory to folding.

Figures 16, 17 and 18 are perspective views illustrating the several stages of the folding operations.

Figure 19 is a schematic drawing showing an electrical circuit for my improved machine.

Referring to the various views of the drawings in detail in which similar reference characters refer to similar parts throughout, the frame work of my improved machine consists substantially of upright side posts 20 connected by suitable transverse bars 21. A shelf 22 may be mounted on upright bars 23 at the top for holding the wrapping material or the article to be wrapped or both as desired.

Floors 24 mounted on the transverse bars 21 support the various mechanisms hereinafter described.

The article to be wrapped, such as a cake 25, or the like, is hand fed to the machine by the operator. The operator then turns the electric switch 26 which closes the electric circuit starting the motor 27 which through the belt 28 and pulley 29 drives the shaft 30, which in turn by means of a sprocket wheel 31 and chain 32 drives a large sprocket wheel 33 fixed to a shaft 34. The shaft 34 drives the various shafts mounting the cams which motivate the various folding, sealing and positioning mechanisms.

The cake 25 to be wrapped is placed on a fixed supporting plate 35 mounted on posts 36 on the upper floor 24 (see Fig. 7). Hingedly connected to each side of plate 35 by means of hinges 37 is a plate 38, the upper surfaces of which plates 35 and 38 are flush affording a supporting surface for a wrapper 39, which is preferably a sheet of paraffined or waxed paper, but of course any other suitable wrapping paper may be used.

Mechanism for first folds

The first folding operation is to fold the wrapper 39 up along the sides of the cake to produce the folds 39' (Fig. 16), the mechanism for such folding being shown in detail in Figures 7 and 8. Mounted pivotally on bolts between brackets 40 at the front and rear edges of the upper floor 24 are levers 41, and to the inner end of each lever 41 is pivotally connected an upright lever 42, which lever 42 is connected to a bracket 43 fastened to the underside of the side folding plate 38. The levers 41 are directly above and in aligned engagement with cams 45 which are fixed to shafts 46 passing across the front and rear of the machine and mounted in suitable bearings 44 on the floor 24 at the front and rear of the machine. The shafts 46 are operatively connected to the shaft 34 by means of the intermeshing gears 47 on the ends of the shafts 34 and 46 as will be seen from Figure 4.

Mechanism for second folds

The second folds produced are the folds 39'' on the top of the cake and are produced by folding the top side free edges of the wrapper inwardly and down-over the top of the cake, said folds being in overlapping relationship as shown in Figure 16. The mechanism for these folds (see Figs. 7 and 8) comprises a folding member or jaw 48 consisting of spaced plates 49 connected together at one end. One of said folding members 48 is hingedly connected to each side plate 38 by means of a hinge 50 and forms a continuation of the plate 38 when the plates are in inoperative position. Each of these folding members 48 may be provided with a screw 51 passing through one of the spaced plates 49 and engaging the other, and having a wing nut 52 on the exterior of the first named spaced plate 49 for adjusting the space between the plates to take care of differences in the height of the cake 25 to be wrapped. Pivotally connected to each bolt mounted between the brackets 40 and to one side of each lever 41 is a double armed lever 53 comprising a lower arm 54 and a spaced upper arm 55 having an upwardly extending offset portion 56, said arms 54 and 55 being connected at their inner ends by means of a bolt 57. Positioned directly above and in aligned engagement with each upper arm 55 is an upright lever 58 having its upper end pivotally connected to the folding member 48 by means of a bracket 59. The lever 58 is in sliding engagement with the upright lever 42 by means of a bolt 60 and slot 61. The bottom free end of the lever 58 is in alignment with the offset portion 56 of the double armed lever 53 and is adapted to be engaged thereby. The lower arm 54 of each double armed lever 53 is positioned above and in aligned engagement with cams 62 fixed on the shafts 46. Each cam 62 has an operating cam face only about substantially half the size of the cam 45 engaging the lever 41.

An electric heating member such as a resistance coil or any suitable design of electric heater may be mounted between the spaced plates 49 if desired.

Mechanism for third folds

The third folds produced are the folds or tucks 39''' which are folded inwardly from the sides of the projecting wrapper portions at each end of the cake, such folds being shown in folded position in Figure 17. The mechanism for tucking these projecting side ends in is shown in Figures 10 and 11. Mounted on brackets 63 on the front and rear of the upper floor 24 are levers 64, which levers are in sliding and pivotal engagement with said brackets by means of a bolt 65 and slot 66 in the end of the lever. Pivotally connected to the inner end of each lever 64 is another lever 67. One end of this lever 67 is pivotally connected to an upright post 68 secured to the floor 24 and its other end is free and mounts a triangular shaped tucker blade or plate 69. It will be understood of course that this plate 69 may be of any shape desired. Each slotted lever is positioned directly above a cam 70 mounted on each shaft 46 and is adapted to be engaged by said cam. Fixed to the lever 64 is a small plate 71 provided with an edge curved to conform to the shape of the working face of the cam 70. A spiral spring 72 has one end fastened to the bracket 63 and its other end to the lever 64 near its inner end to effect movement of the lever in one direction.

Mechanism for fourth folds

The fourth folds are the folds 73 and 74 which are folded downwardly and upwardly from the top and bottom ends respectively of the projecting wrapper portions at each end of the cake, said folds being shown in unfolded position in Figure 17 and in folded position in Figure 18. The mechanism for producing these folds is shown in Figures 1 and 14. Pivotally connected to a bracket 75 on an upright post 23 on each side of the upper floor 24 is a horizontal lever 77 and pivotally connected to the outer end of each lever 77 is an elongated curved upright member 78. Pivotally mounted on a bolt 79 between the upright posts 23 on each side of said floor 24 is a lever member 80. Depending from the inner end of each lever 80 and in sliding engagement therewith by means of a slot 81 and bolt 82 is a plate 83. A weight 84 depends from the outer end of each lever 80. The upper end of long lever 78 is connected to the lever 80 at a point inside of its pivotal connection to the upright post 23. Each plate 83 is guided in its up and down movements by means of a guiding frame 85 mounted on the inner end of a bracket 86 mounted on each upright post.

Pivotally connected to each lever 77 adjacent its inner end by means of a bolt 87 and extending inwardly of said lever is another lever 88. The inner free end of each lever 88 is disposed below and supports a plate 89 which slides freely between uprights 90 mounted on the upper floor 24 on each side of the center of the floor. Each plate 89 is guided in its up and down movements by a guide frame 91.

Each plate 83 and 89 may be heated by an electric heating member 92 (see Figs. 11 and 13) including a resistance 93 in circuit with the circuit operating the machine. The heating element 92 may be secured to the frame 91 by means of a strap 94 and suitably connected to conductors (not shown).

Weights 95 are suspended from the lower end of each plate 89 to pull it down by gravity.

Each lever 77 is positioned directly above and in aligned engagement with cams 76 fixed to shaft 34 and to a shaft 96 disposed at right angles to the shafts 46 and operatively connected to said shafts 46 by means of intermeshing gears 97 interposed therebetween as will be seen from Figure 4. Each lever 88 is positioned directly above and in aligned engagement with a cam 98 fixed to each of shafts 34 and 96 and positioned alongside of the cams 76.

Mechanism for sealing end folds

The final operation is the sealing and pressing of the end folds together to the position shown in Figure 18. The mechanism for this sealing and pressing operation is shown in Figures 1, 5 and 14. Mounted pivotally on a bracket or arm 99 fixed to the upright posts 23 is a lever 100 and pivotally connected to the lever 100 is one end of a link member 101. Pivotally connected to the other end of link 101 is the short arm 102 of a bell crank member. This bell crank member is pivotally connected to lugs 103 on posts 90. The long arm 104 of the bell crank member carries a presser plate 105 at its outer free end, which plate 105 is adapted to move slightly relative to the long arm. A spiral spring 106 is disposed between the plate 105 and the outer end of the long arm on a bolt 107 to permit yielding adjustment of the plates 105 relative to the end of the cake to compensate for various shapes and sizes of cakes. Each lever 100 is positioned directly above and in aligned engagement with cams 108 fixed to the shafts 34 and 96. These cams 108 have a shorter working face than the cams 76 and have their faces positioned at a different angle.

Cake positioning mechanism

Mechanism is provided for initially positioning the cake 25 on the plate 35 in proper position for wrapping. The mechanism for this positioning is shown in Figures 1, 5 and 14. Pivotally mounted on a bracket 109 fixed to each upright post 23 is a lever 110. Slidably connected with each upright post 23 is a bar 111. Each bar 111 carries a finger member 112 which is normally positioned at the side edge of the plate 35. The lever 110 has a slotted upper end which is in engagement with a pin 113 on the bar 111. The outer end of the bar 111 passes through a bracket 114 mounted on each post 23 and encircling this outer end of the bar 111 is a spiral spring 115, one end of which is anchored to the outer end of the bracket 114 and its other end to the bar 111 as indicated at 116. This spring 115 effects movement of the bar 111 in one direction. The lower free end of each lever 110 is in alignment with the movement of cams 117 on shafts 34 and 96.

Operation of the various mechanisms

In using the machine, the wrapper 39 is positioned flat on the cake supporting plate 35, side folding plates 38 and top folding plates or jaws 48. Upstanding clips or fingers 118'' may be provided on one of the folding plates 38 to prevent the end edge of the wrapper from passing under or between the spaced plates 49 of the adjacent folding member 48 when the wrapper is fed or placed on the plates. The cake is placed on the wrapper over the plate 35 between the fingers 112. The switch 26 is then turned closing the electric circuit and starting the motor which by means of the belt 28, chain 32 and intermediate wheels drives the shaft 34. This shaft 34 drives the shafts 46 and 96 by means of the intermeshing gears 47 and 97.

Rotation of shafts 46 turns cams 45 with their long working faces, which cams immediately begin to push levers 41 and 42 upwardly, the levers 42 pushing the side plates 38 upwardly into the position shown in Fig. 8. Rotation of said shafts 46 also turns cams 62 which are in engagement with the double levers 53, but said cams 62 having a shorter working face than the cams 45 engage the double lever 53 a little later than the cams 45 engage the levers 41. These cams 62 move the double levers 53 upwardly so that the upper arms 55 of said levers 53 push the upright levers 58 upwardly and continued movement of said cams 62 makes the free lower ends of said upright levers 58 ride upwardly over the offset portions 56 of said upper arms in proper time and manner to cause the upper fixed ends of said levers 58 to push the top folding members 48 and upper free edges of the wrapper over against the top of the cake to form the upper folds 39''. The cams 45 and 62 on the shaft 46 at the rear of the machine and shown to the left of Figs. 7 and 8 are disposed at a different angle thereon than the cams 45 and 62 on the other shaft 46 at the front with the result that movement of the levers 41 and 58 by the latter cams is delayed sufficiently to permit the top fold to be completed by the member 48 connected to the rear shaft 46 before the top fold is made by the member 48 connected to the front shaft 46 as shown in Figure 8, so that the top folds will overlap as shown in Figure 16. As aforesaid, these members 48 may be electrically heated in order to heat the wrapper at this joint in order to produce a seal, if desired.

Simultaneously with the upward movement of the levers 41 and 58, the rotation of the shafts 34 and 96 turns cams 117 which forces the lower free ends of the levers 110 inwardly and its upper end outwardly which outward movement carries the bar 111 with its finger 112. This outward movement of the bar 111 is opposed by the spring 115 which normally tends to push the bar inwardly. By the time the side plates 38 reach their upward operative folding position such as shown in Fig. 8, the bars 111 with their positioning fingers 112 are moved out of the way, due to the action of the cams 117 which are shaped and positioned on the shafts to effect this result.

Simultaneously with the movement of the shafts 46 and the cams 45 and 62, the cams 70 turn, but said cams 70 are mounted on shafts 46 with their working faces at an angle to the working faces of cams 45 and 62 so that said cams 70 do not engage the levers 64 until after the levers 41 and 58 have started on their upward course. The turning of the cams 70 and their engagement with the levers 64 by means of the plates 71 pushes the upright levers 67 upwardly and inwardly so that the plates or blades 69 carried by said levers tuck in the side edges which project beyond the opposite ends of the wrapper (see Figs. 16 and 17) to the position as shown in Figure 17. Engagement of the working faces of cams 70 with the curved surfaces of plates 71 prevents the rocking of the upright levers 67. Inward folding movement of the levers 67 is guided by means of guide lugs 120.

Rotation of the shafts 34 and 96 turns the cams 76 which being in engagement with levers 77 forces the outer ends of said levers 77 downwardly which pulls the long curved levers 78 downwardly. The levers 78 in turn pull the inner end of levers 80 downwardly which causes the upper sliding plates 83 to slide downwardly across the ends of the cake making the end fold 73. Rotation of said shafts also turns cams 98 which cams having their faces shorter than the cams 76 and positioned at an angle thereto do not move the levers 88 until after movement of the levers 77 start. The inner ends of levers 88 move upwardly and force the lower plates 89 upwardly across the ends of the cake to make the bottom end fold 74. Because of the delayed movement the lever 88 and the short upward stroke of the plate 89, the downwardly moving upper plate 83 and the lower upwardly moving plate 89 slide across the end of the cake at the same time so that the end folds 73 and 74 are made simultaneously. Before the upper and lower sliding plates 83 and 89 slide across the ends of the cake, the spiral springs 72 will have pulled the levers 67 with their plates 69 away from the ends of the cake, as cam 70 moves away from the plate 71.

Rotation of the shafts 34 and 96 also turns cams 108, which having their working faces mounted at an angle to the faces of the cams 76 and 98 engage the levers 100 after the start of the movements of the levers 77 and 88, and move said levers 100 upwardly which movement forces the levers 100 upwardly rocking the bell crank levers on their pivots and forcing the long arms 104 with their plates 105 inwardly against the end folds of the wrapper to the position shown in Figure 14. The delayed movement of the levers 100 brings the long arms 104 with their presser plates 105 against the ends of the cake after the arrival of the sliding end folding plates 83 and 89 so that said presser plates 105 tend to press said sliding plates against the folds. The upper and lower sliding plates 83 and 89 being heated by the heating elements 92 tend to melt the paraffin or wax on the paper at the end folds so that pressure of the plates 105 tend to seal the folds at this point.

My invention contemplates one complete movement of the machine at a time so as to wrap one cake at a time. This is accomplished by placing a limit switch or cut-out switch in the same circuit with the motor 27, which may be in circuit with the house current. This limit switch as shown in Figure 3 comprises a rotating member 118 formed of insulating material and carrying a band 118' of metal or other conducting material. This rotatable member is fixed on shaft 34 and is disposed between brushes 119 mounted on brackets 120' electrically connected to the conductors 121. The insulating material is so disposed relative to the brushes that after one complete cycle of operations the insulating portion comes in contact with one of the brushes when the circuit is broken and the various mechanisms return to their inoperative positions. The side plates 38 and associated levers for producing the side folds and top folds fall back to inoperative position by gravity. The plates 69 and associated levers for producing the side end tucks return to inoperative position by means of the spiral spring 72. The upper and lower sliding plates 83 and 89 and associated levers for producing the upper and lower end folds return to inoperative positions by means of the weights 84 and 95, respectively.

Suitable covers 122 having necessary openings for the various protruding parts and movable members may be hinged to the front and rear upper transverse bars of the frame work in order to protect the various mechanisms, only one of said covers being shown in Figure 4.

While I have illustrated and described the preferred embodiment of my invention, it will be understood that various changes might be made in details without departing from the principle of my invention and I desire to be limited only by the scope of the appended claims.

I claim:

1. In a machine for wrapping cakes or the like, a supporting plate for the cake; means adapted to position the cake on its support, said means comprising finger members disposed on opposite sides of the plate and slidable rods mounting said finger members; automatic means to move said positioning means away from the supporting plate, said moving means comprising rotatable shafts, cams on the shafts, levers in engagement with said cams and movable thereby and a slot and stud connection between each lever and rod; and automatic means to return the finger members to the supporting plate including a spiral spring surrounding each rod and having one end anchored in said rod and its other end in a stationary part of the machine whereby adjustment is effected.

2. In a machine for wrapping cakes or the like, mechanism for positioning the cake on its supporting plate, comprising finger members disposed on opposite sides of said plate and slidable rods mounting said finger members; mechanism for folding the wrapper up and around the sides of the cake; mechanism for folding in overlapped relationship the top free edges of the wrapper over the top of the cake; and mechanism for folding the free ends of the wrapper projecting on opposite ends of the cake.

3. In a machine for wrapping cakes or the like, a support for the cake; mechanism for folding the wrapper up and around the sides of the cake; mechanism for folding the top and bottom free ends of the wrapper projecting on opposite ends of the cake, comprising upper and lower horizontally disposed levers, a lever disposed between each of the upper and lower levers and pivotally connected thereto, a plate movable vertically downward by said upper lever, another lever pivotally connected to said lower lever, a plate movable vertically upward by said latter lower lever, a cam under each of said lower levers to motivate the same and means to rock said cams; mechanism for folding the free ends of the wrapper projecting beyond the ends of the cake; and means for guiding the vertical movements of said plates including a guide frame mounted on the frame of the machine.

4. In a machine for wrapping cakes or the like, a support for the cake; mechanism for folding the wrapper up and around the sides of the cake; mechanism for folding the top free edges of the wrapper over the top of the cake; mechanism for folding the wrapper at its projecting top and bottom free ends on opposite ends of the cake, comprising upper and lower horizontally disposed levers, a lever disposed between each of the upper and lower levers and pivotally connected thereto, a plate movable vertically downward by said upper lever, another lever pivotally connected to said lower lever, a plate movable vertically upward by said latter lower lever, a cam under each of said lower levers to motivate the same and means to rock the cams; mechanism for folding the side free ends of the wrapper projecting beyond the ends of the cake, comprising levers movable to and from the ends of the cake, blades carried by said levers and adapted to tuck in the side free ends of the wrapper, cams for motivating said levers and means for rocking said cams; means for guiding the vertical movements of said plates, including guide frames; and means for guiding the movements of said levers and blades for tucking in said side free ends of the wrapper including guide lugs.

5. In a machine for wrapping cakes or the like, in combination, a support for the cake; mechanism for folding the wrapper up and around the sides of the cake, including levers, plates on said levers adapted to engage the wrapper, cams for motivating said levers, and shafts for rocking said cams; mechanism for folding in overlapped relationship the top free edges of the wrapper over the top of the cake, including levers, plates on said levers adapted to engage the top free edges of the wrapper, cams for motivating said levers, disposed on the aforesaid shafts so as to engage the latter levers subsequent to the start of movement of the first named levers; mechanism for folding the top and bottom free ends of the wrapper projecting on opposite ends of the cake, including levers, plates on said levers adapted to engage the top and bottom free ends of the wrapper cams and shafts therefor; mechanism for folding the side free ends of the wrapper projecting on opposite ends of the cake, including levers, blades on said levers adapted to engage the side free edges of the wrapper, cams for motivating said levers disposed on the first named shafts at an angle to the cams motivating the side and top edges of the wrapper whereby the folds of the side free ends are made subsequent to the side and top folds; the cams for motivating the levers of the mechanism for making the folds at the top and bottom free ends of the wrapper being disposed on their shafts to delay movement of the levers until after movement of the mechanism for making the side end folds; means for returning said side end folding mechanism to initial position including a spiral spring; mechanism for sealing the folded ends of the wrapper, including levers, plates carried by the levers and adapted to impinge against the end folds, cams mounted on the shaft mounting the cams of the top and bottom free end folding mechanism, and disposed thereon at an angle to the aforesaid cams whereby movement of the sealing mechanism is delayed until after movement of all of the aforesaid mechanisms; and an electric motor operatively connected to said shafts for driving the same.

FRANK BALDWIN.